United States Patent
Bao

(10) Patent No.: US 12,355,895 B2
(45) Date of Patent: Jul. 8, 2025

(54) WEB-SIDE DATA SIGNATURE METHOD AND APPARATUS AND COMPUTER DEVICE

(71) Applicant: SHANGHAI BILIBILI TECHNOLOGY CO., LTD., Shanghai (CN)

(72) Inventor: Jiwei Bao, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 305 days.

(21) Appl. No.: 18/039,922

(22) PCT Filed: Aug. 12, 2021

(86) PCT No.: PCT/CN2021/112309
§ 371 (c)(1),
(2) Date: Jun. 1, 2023

(87) PCT Pub. No.: WO2022/116587
PCT Pub. Date: Jun. 9, 2022

(65) Prior Publication Data
US 2024/0031166 A1    Jan. 25, 2024

(30) Foreign Application Priority Data
Dec. 2, 2020   (CN) .......................... 202011404814.3

(51) Int. Cl.
*H04L 9/32* (2006.01)
*G06F 21/64* (2013.01)
(Continued)

(52) U.S. Cl.
CPC ............ *H04L 9/3247* (2013.01); *G06F 21/64* (2013.01); *G06F 21/57* (2013.01); *H04L 63/0428* (2013.01); *H04L 67/02* (2013.01)

(58) Field of Classification Search
None
See application file for complete search history.

(56) References Cited

U.S. PATENT DOCUMENTS 10,868,675 B2 *  12/2020  Walker .................... G06F 21/57
2005/0248148 A1 *  11/2005  Schenck ............... G09F 3/0297
                                                          283/74
(Continued)

FOREIGN PATENT DOCUMENTS

CN         1972296 A       5/2007
CN     106559219 A  *     4/2017
(Continued)

OTHER PUBLICATIONS

Alessio Parzian; (Java Card Bytecode Verification); p. 159; Published in August 5 (Year: 2015).*
(Continued)

*Primary Examiner* — Ali H. Cheema
(74) *Attorney, Agent, or Firm* — BakerHostetler

(57) ABSTRACT

This application discloses a Web-side data signature method and apparatus, and a computer device. The method includes: receiving a signature request to sign target data; obtaining byte code signature information and corresponding glue information from a server; processing the byte code signature information and the glue information to generate a byte code signature component and a glue component, and associating the byte code signature component with the glue component; and scheduling the byte code signature component by using the glue component, to sign the target data. This application further provides a computer-readable storage medium. In this application, by using a manner in which a byte code signature component that cannot be easily cracked is established, and then the byte code signature component is scheduled by using a glue component for (Continued)

signing, security of signature logic and security of signed data are effectively improved.

17 Claims, 4 Drawing Sheets

(51) Int. Cl.
    *G06F 21/57*     (2013.01)
    *H04L 9/40*     (2022.01)
    *H04L 67/02*     (2022.01)

(56) References Cited

U.S. PATENT DOCUMENTS

| | | | | |
|---|---|---|---|---|
| 2007/0150855 A1* | 6/2007 | Jeong | ............... | G06F 8/36 |
| | | | | 717/106 |
| 2012/0284505 A1* | 11/2012 | Smith | ............... | H04L 63/08 |
| | | | | 713/151 |
| 2018/0260564 A1 | 9/2018 | Porteboeuf | | |
| 2019/0034422 A1* | 1/2019 | Chen | ............... | G06F 16/178 |
| 2024/0193136 A1* | 6/2024 | Chen | ............... | G06F 16/214 |

FOREIGN PATENT DOCUMENTS

| | | | | |
|---|---|---|---|---|
| CN | 106878319 A | 6/2017 | | |
| CN | 109672518 A | 4/2019 | | |
| CN | 110071810 A | 7/2019 | | |
| CN | 111796865 A | 10/2020 | | |
| CN | 111984963 A | 11/2020 | | |
| CN | 112600803 A | 4/2021 | | |
| JP | 2009238231 A | * 10/2009 | ............... | G06F 8/20 |

OTHER PUBLICATIONS

International Patent Application No. PCT/CN2021/112309; Int'l Search Report; dated Nov. 11, 2021; 2 pages.

* cited by examiner

WEB-SIDE DATA SIGNATURE METHOD AND APPARATUS AND COMPUTER DEVICE

CROSS-REFERENCE TO RELATED APPLICATIONS

This application is the U.S. National Stage of International Application No. PCT/CN2021/112309, filed on Aug. 12, 2021, which claims priority to Chinese Patent Application No. 202011404814.3, filed with the China National Intellectual Property Administration on Dec. 2, 2020, and entitled "WEB-SIDE DATA SIGNATURE METHOD AND APPARATUS AND COMPUTER DEVICE", both of which are incorporated herein by reference in their entireties.

TECHNICAL FIELD

This application relates to the field of Internet technologies, and in particular, to a Web-side data signature method and apparatus, and a computer device.

BACKGROUND

In recent years, with wide application of the Internet, a data service industry has also developed rapidly. Generally, a user may access various data resources by using a web page or an application (APP) page. A data service provider may provide a data access service for the user by using the web page or the APP page. Certainly, for some specific data services, for example, a financial data service provided by a financial service provider, or a paid data service provided by a video data service provider or a game data service provider, to protect benefits of a data service provider or a user, a data access process usually needs to be signed or encrypted for these data services.

The inventor finds that in the conventional technology, for a data access process implemented on a Web-side page, a signature encryption manner of the data access process is usually loading a signature plug-in on a Web-side, and then a signature is implemented by the signature plug-in. However, in most cases, the signature plug-in is exposed directly to the Web-side, and may be easily cracked by a hacker. Therefore, this signature manner is still at risk of a signature fraud and has low security.

SUMMARY

This application provides a Web-side data signature method and apparatus, and a computer device, and a problem in the conventional technology can be solved that in a Web-side signature process, signature logic can be easily cracked and signature security is relatively low.

First, to implement the foregoing objectives, this application provides a Web-side data signature method. The method includes:

receiving a signature request of target data; obtaining byte code signature information and corresponding glue information from a server; processing the byte code signature information and the glue information, to obtain a corresponding byte code signature component and a corresponding glue component, and associating the byte code signature component with the glue component; and scheduling the byte code signature component by using the glue component, to sign the target data.

For example, after the receiving a signature request of target data and before the obtaining byte code signature information and corresponding glue information from a server, the method further includes: detecting whether a Web-side meets a preset running condition, and rejecting the signature request if the Web-side does not meet the running condition.

For example, the detecting whether a Web-side meets a preset running condition includes: controlling the Web-side to execute an initialization command in a same coding format as that of the byte code signature component; and if the initialization command is successfully executed, indicating that the Web-side meets the running condition.

For example, the byte code signature component is implemented based on WebAssembly, and the glue component is implemented based on JavaScript.

For example, the processing the byte code signature information and the glue information, to obtain a corresponding byte code signature component and a corresponding glue component, and associating the byte code signature component with the glue component includes: performing instantiation on the byte code signature information to obtain the byte code signature component, performing instantiation on the glue information to obtain the glue component, and associating the byte code signature component with the glue component.

For example, the associating the byte code signature component with the glue component includes: setting a public interface for the byte code signature component, where the public interface is configured to receive an external parameter and execute a signature function, setting a signature interface for the glue component, where the signature interface is configured to schedule external data, and setting an association interface for the glue component, where the association interface is configured to associate with the public interface of the byte code signature component.

For example, the scheduling the byte code signature component by using the glue component, to sign the target data includes: inputting a signature rule parameter of the target data into the glue component by using the signature interface, and scheduling the public interface of the byte code signature component by using the glue component, to transmit the signature rule parameter of the target data to the byte code signature component to execute a signature operation.

For example, before the byte code signature component executes the signature operation, the method further includes: obtaining a Web-side parameter corresponding to the Web-side, performing consistency comparison between the Web-side parameter and a preset reference parameter, and refusing to execute the signature operation if the Web-side parameter is inconsistent with the reference parameter.

For example, when the Web-side is a browser, the Web-side parameter includes a browser window size and/or a page port.

In addition, to implement the foregoing objectives, this application further provides a Web-side data signature apparatus. The apparatus includes:

a receiving module, configured to receive a signature request of target data; a downloading module, configured to obtain byte code signature information and corresponding glue information from a server; a processing module, configured to process the byte code signature information and the glue information, to obtain a corresponding byte code signature component and a corresponding glue component, and associate the byte code signature component with the glue component; and a signature module, configured to schedule the byte code signature module by using the glue component, to sign the target data.

Further, this application further provides a computer device. The computer device includes a memory and a processor, the memory stores a computer-readable instruction capable of being run by the processor, and the computer-readable instruction is executed by the processor to implement a step of the foregoing Web-side data signature method.

Further, to implement the foregoing objectives, this application further provides a computer-readable storage medium. The computer-readable storage medium stores a computer-readable instruction, and the computer-readable instruction is capable of being executed by at least one processor, so that the at least one processor performs a step of the foregoing Web-side data signature method.

Compared with the conventional technology, the Web-side data signature method and apparatus, the server, and the computer-readable storage medium provided in this application can receive a signature request of target data, obtain byte code signature information and corresponding glue information from a server, process the byte code signature information and the glue information, to obtain a corresponding byte code signature component and a corresponding glue component, associate the byte code signature component with the glue component, and schedule the byte code signature component by using the glue component, to sign the target data. By using a manner in which a byte code signature component that cannot be easily cracked is established, and then the byte code signature component is scheduled by using a glue component for signing, security of signature logic and security of signed data are effectively improved.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application. All other embodiments obtained by a person of ordinary skill in the art based on the embodiments of this application without creative efforts shall fall within the protection scope of this application.

It should be noted that the terms "first" and "second" in this application are merely used for description, and shall not be understood as an indication or implication of relative importance or an implicit indication of a quantity of indicated technical features. Therefore, features limited by "first" or "second" may explicitly or implicitly include at least one of the features. In addition, technical solutions in the embodiments may be combined with each other, provided that a person of ordinary skill in the art can implement the combination. When the combination of the technical solutions is contradictory or cannot be implemented, it should be considered that the combination of the technical solutions does not exist and does not fall within the protection scope of this application.

Figure 1:
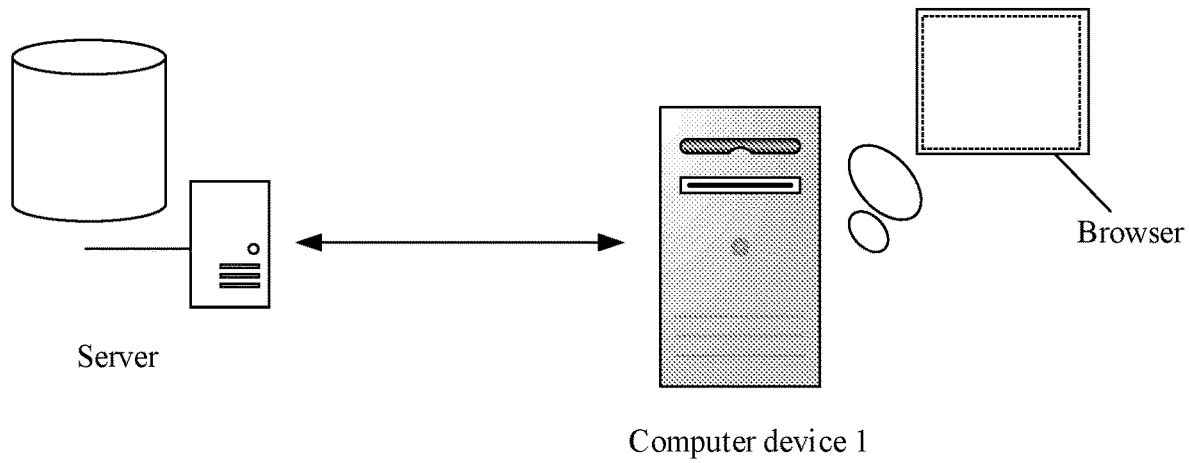
FIG. 1 is a schematic diagram of an application environment according to an embodiment of this application.

FIG. 1 is a schematic diagram of an application environment according to an embodiment of this application. Referring to FIG. 1, a computer device 1 is connected to a server. The computer device 1 provides a Web-side page for interacting with a user. The Web-side page may be a browser web page, or may be an application i.e. APP page. The computer device 1 may receive a signature request of target data by using the Web-side page, then obtain byte code signature information and corresponding glue information from the server, then process the byte code signature information and the glue information, to generate a corresponding byte code signature component and a corresponding glue component, and finally, schedule the byte code signature component by using the glue component, to sign the target data. In this embodiment, the computer device 1 may be a mobile phone, a tablet, a portable device, a PC, another electronic device that has a display function, or the like. The server may be a mobile phone, a tablet, a portable device, a PC, a merchandise selling platform, a video service platform, a financial service platform, or the like.

Embodiment 1

Figure 2:
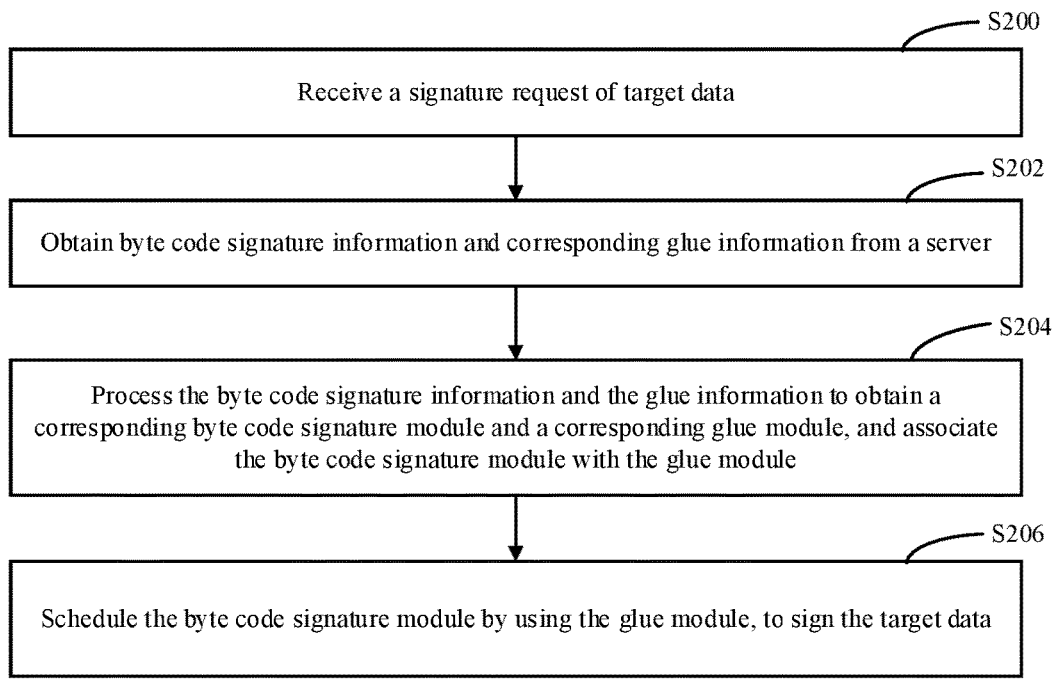
FIG. 2 is a schematic flowchart of a Web-side data signature method according to a specific embodiment of this application.

FIG. 2 is a schematic flowchart of a Web-side data signature method according to an embodiment of this application. It may be understood that a flowchart in this method embodiment is not used to limit an execution sequence of steps. The following is described by using an example in which the computer device 1 is an execution body.

As shown in FIG. 2, the Web-side data signature method may include steps S200 to S206.

Step S200: Receive a signature request of target data.

Specifically, the computer device 1 provides a Web-side page for interacting with a user. The Web-side page may be a browser web page, or may be an APP page. The computer device 1 may receive the signature request of the target data by using the Web-side page. For example, the computer device 1 needs to send a financial data service request to a financial data service platform, and the target data is the financial data service request. For another example, when the computer device 1 needs to request access to paid game data or paid video data, the computer device 1 sends a paid data access request to a game data service platform or a video data service platform, and the target data is the paid data access request. Certainly, a signature for the target data may merely be verification of a user identity or user permission of a user that uses the computer device 1. In conclusion, after the user triggers the signature request of the target data by using a Web-side, the computer device 1 may receive the signature request of the target data.

Step S202: Obtain byte code signature information and corresponding glue information from a server.

Step S204: Process the byte code signature information and the glue information, to obtain a corresponding byte code signature module and a corresponding glue module, and associate the byte code signature module with the glue module.

Specifically, after receiving the signature request of the target data, the computer device 1 obtains the byte code signature information and the corresponding glue information from the server based on the signature request. Certainly, after the signature request of the target data is received and before the byte code signature information and the corresponding glue information are obtained from the server, the computer device 1 further detects whether the Web-side meets a preset running condition, and rejects the signature request if the Web-side does not meet the running condition.

The glue information and the byte code signature information may be program code of the corresponding glue module and program code of the byte code signature module. In this embodiment, that the computer device 1 detects whether the Web-side meets a preset running condition includes: controlling the Web-side to execute an initialization command in a same coding format as that of the byte code signature module; and if the initialization command is successfully executed, indicating that the Web-side meets the running condition.

In a specific embodiment, the byte code signature component is implemented based on WebAssembly, and the glue module is implemented based on JavaScript. Therefore, a process in which the computer device 1 detects whether the Web-side meets the preset running condition is as follows: First, preset short WebAssembly initialization code is loaded into the Web-side, and an objective of the code is to check whether a current browser supports execution of WebAssembly. After the Web-side executes the WebAssembly initialization code, if successful execution is returned, it is considered that the Web-side meets the running condition, that is, supports running of WebAssembly byte code. After the Web-side executes the WebAssembly initialization code, if an execution failure is returned, or the Web-side cannot recognize the WebAssembly initialization code, it indicates that the Web-side does not meet the running condition, that is, does not support running of the WebAssembly byte code. Then, the computer device 1 rejects the signature request and gives a related prompt, for example, "A current Web-side version does not support a signature service. Please download a XX version Web-side".

When it is determined that the Web-side meets the running condition, the computer device 1 further downloads, from the server, a related file package that is used to correspond to the signature data and that includes the byte code signature information and the corresponding glue information, and then processes the byte code signature information and the glue information, to obtain the corresponding byte code signature module and the corresponding glue module.

In this embodiment, that the computer device 1 processes the byte code signature information and the glue information, to obtain the corresponding byte code signature module and the corresponding glue module, and associates the byte code signature module with the glue module includes: performing instantiation on the byte code signature information to obtain the byte code signature module, performing instantiation on the glue information to obtain the glue module, and associating the byte code signature module with the glue module. The associating the byte code signature module with the glue module includes: setting a public interface for the byte code signature module, where the public interface is configured to receive an external parameter and execute a signature function, setting a signature interface for the glue module, where the signature interface is configured to schedule external data, and setting an association interface for the glue module, where the association interface is configured to associate with the public interface of the byte code signature module.

Specifically, the glue information and the byte code signature information are downloaded from the server and are directly stored at a preset location in a corresponding storage unit of the Web-side. When a signature is required, the computer device 1 needs to extract the glue information and the byte code signature information from the preset location in the storage unit of the Web-side, separately executes instantiation to obtain the corresponding glue module and the corresponding byte code signature module, and loads the glue module and the byte code signature module into a cache memory. In addition, the computer device 1 associates the glue module with the byte code signature module that are loaded into the cache memory. The association is a relationship of ownership, and enables one class to learn of an attribute and a method of another class. In this embodiment, the computer device 1 associates the glue module with the byte code signature module, so that the glue module learns of a part of attributes and methods of the byte code signature module. Attributes and methods herein include a scheduling interface and a parameter required for a signature. In other words, the computer device 1 associates the glue module with the byte code signature module, and then schedules the byte code signature module by using the glue module, so that security of the byte code signature module is ensured.

Currently, a market share of browsers that support WebAssembly is about 90%, and basically all browsers support JavaScript. Therefore, for example, byte code signature code is in a WebAssembly format, and glue code is in a JavaScript format. Therefore, the computer device 1 may separately perform instantiation on the byte code signature code and the glue code, to obtain a corresponding byte code signature component in the WebAssembly format and a corresponding glue component in the JavaScript format. The computer device 1 sets the signature interface for the glue component, to perform signature encryption on any character string. After an external caller invokes the signature interface of the glue component, the glue component invokes, by using the association interface, the public interface that is of the byte code signature component and that is associated with the association interface, so that the external parameter is received and the signature function is executed.

Figure 3:
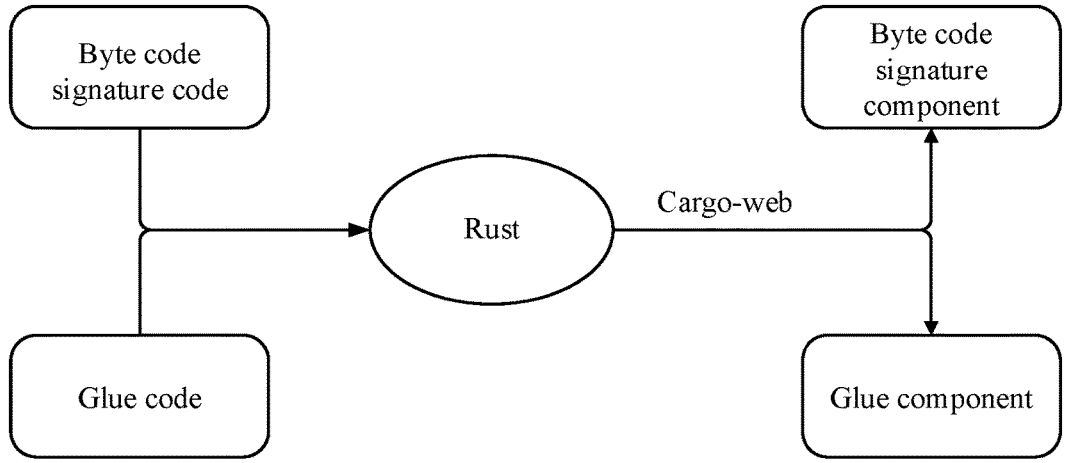
FIG. 3 is a flow effect diagram of instantiation of glue information and byte code signature information according to an example of this application.

FIG. 3 is a flow effect diagram of instantiation of glue code and byte code signature code according to an example of this application. In this embodiment, the glue information is specifically the glue code, and the byte code signature information is the byte code signature code. Then, the computer device 1 uses Rust+cargo-web as an example to implement the instantiation of the glue code and the byte code signature code. Because a Rust+cargo-web manner may implement compilation of a plurality of types of languages, the corresponding instantiation of both the glue code and the byte code signature code may be performed to obtain a corresponding glue component and a corresponding byte code signature component.

Step S206: Schedule the byte code signature component by using the glue component, to sign the target data.

Specifically, after obtaining the byte code signature component and the glue component, the computer device 1 schedules the byte code signature component by using the glue component, to sign the target data. In this embodiment, that the computer device 1 schedules the byte code signature component by using the glue component, to sign the target data includes: inputting a signature rule parameter of the target data into the glue component by using the signature interface, and scheduling the public interface of the byte code signature component by using the glue component, to transmit the signature rule parameter of the target data to the byte code signature component to execute a signature operation.

A process in which the computer device 1 invokes the public interface of the byte code signature component by using the association interface of the glue component actually is directly reading and writing a memory reference inside the computer device 1 by using the glue code, so that a signature encryption function of the byte code signature component is invoked. Finally, after signature encryption for the target data is completed inside the byte code signature component, the computer device 1 returns a result to the external caller by using the glue component.

Figure 4:
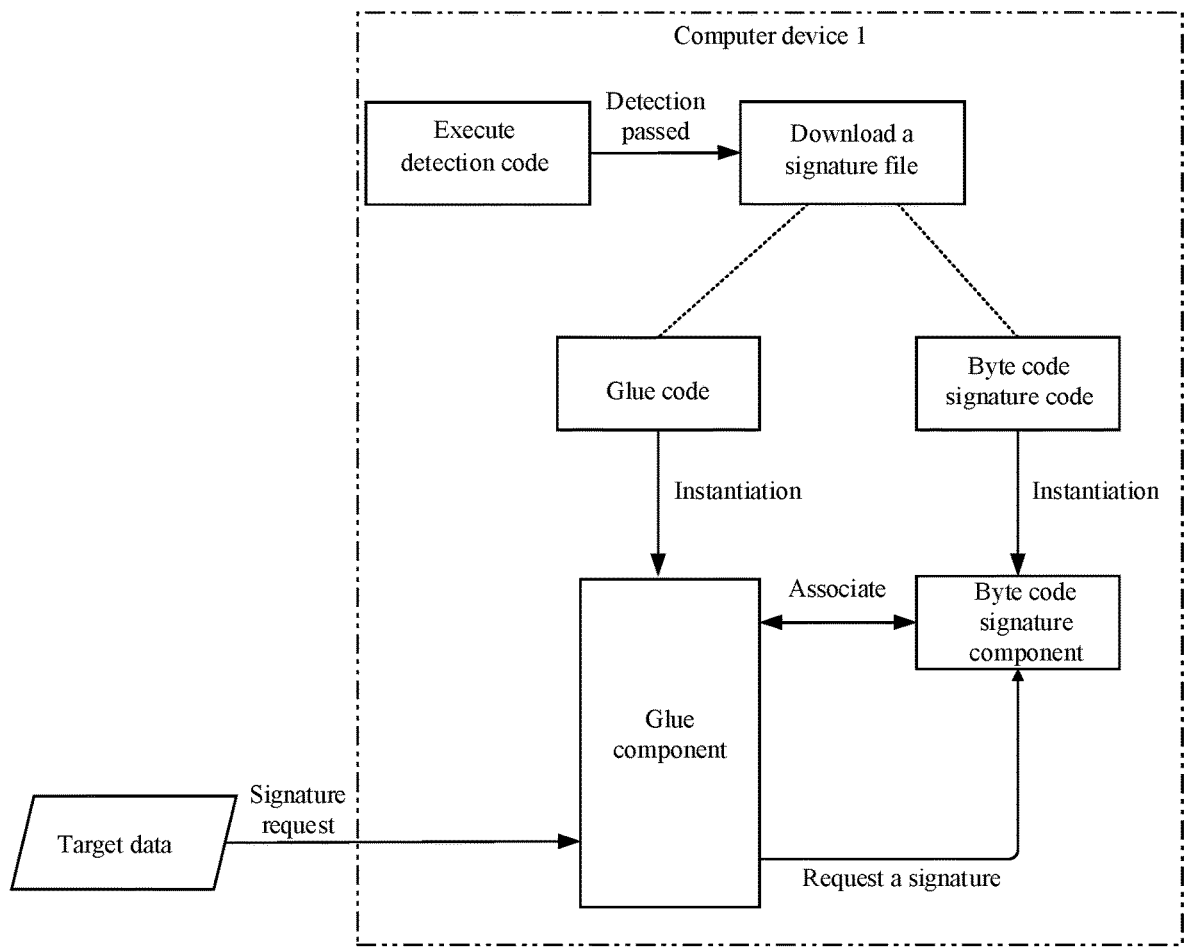
FIG. 4 and FIG. 5 are flow effect diagrams of implementing a Web-side data signature according to an example of this application.
Figure 5:
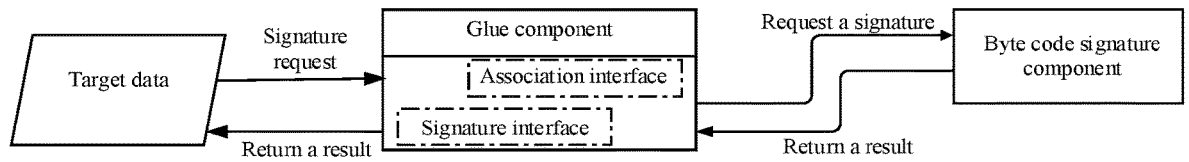

FIG. 4 and FIG. 5 are flow effect diagrams of implementing a Web-side data signature according to an example of this application. The glue component may be used as the glue component, and the byte code signature component may be used as the byte code signature component.

As shown in FIG. 4, the target data first sends the signature request to the computer device 1, and then the computer device 1 executes detection code, to determine whether the Web-side meets a running condition of the byte code signature component. When detection is passed (the Web-side meets the running condition), the computer device 1 downloads a signature file including the glue code and the byte code signature code, and then separately performs instantiation on the glue code and the byte code signature code, to obtain the corresponding glue component and the corresponding byte code signature component. The computer device 1 associates the glue component with the byte code signature component. Then, the computer device 1 sends the signature request of the target data to the glue component, and then the glue component requests a signature from the byte code signature component based on the signature request. The byte code signature component executes a signature operation based on the signature request and a corresponding signature parameter.

As shown in FIG. 5, the target data sends the signature request to the glue component by using the signature interface of the glue component, and then the glue component invokes the byte code signature component by using the association interface, and requests the signature from the byte code signature component based on the signature request. The byte code signature component executes the signature operation based on the signature request and the corresponding signature parameter. Finally, the byte code signature component feeds back signature result data to the target data by using the glue component.

In another specific embodiment, in a process in which the byte code signature component is scheduled by using the glue component, to sign the target data, before the signature operation is executed, the computer device 1 further performs the following by using the byte code signature component: obtaining a Web-side parameter corresponding to the Web-side, performing consistency comparison between the Web-side parameter and a preset reference parameter, and refusing to execute the signature operation if the Web-side parameter is inconsistent with the reference parameter. For example, when the Web-side is a browser, the Web-side parameter includes a browser window size and/or a page port.

To ensure that the byte code signature component runs in a correct Web-side environment, the computer device 1 sets a Web-side environment monitoring function component in the byte code signature component, to further perform a security check on a Web-side environment. For example, when the Web-side is a browser, some parameters such as a current browser window size and a page port may be checked, to ensure that the user triggers the signature request in a correct browser. Because structure content of the byte code signature component is byte code, and the byte code belongs to an unreadable type for the user, the computer device 1 sets Web-side environment security check logic in the byte code signature component, so that external cracking is not easy, thereby further enhancing security of the byte code signature component.

Further executing the security check of the Web-side environment is mainly to prevent some users or underground industries (referring to specific production of false requests by using nonofficial channels) from obtaining the byte code signature component and the glue component by forging a request by using a script, executing the byte code signature component and the glue component in an abnormal Web-side environment, and achieving an objective of forging a large quantity of normal request behavior (currently, a large part of forged requests come from this method). By further executing a security check in the byte code signature component, host environment security of a current user can be ensured to a greater extent.

Figure 6:
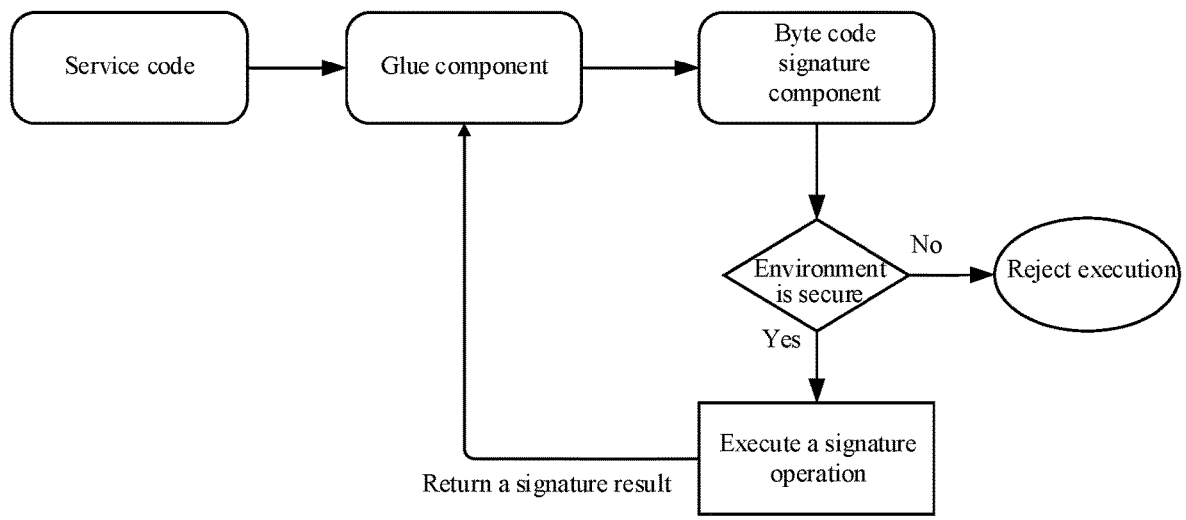
FIG. 6 is a flow effect diagram of execution of a signature operation after executing a security check of a Web-side environment according to an example of this application.

FIG. 6 is a flow effect diagram of execution of a signature operation after executing a security check of a Web-side environment according to an example of this application. Service code sends a signature request to the glue component, and then the glue component invokes the byte code signature component. After being invoked and before signing, the byte code signature component executes an environment security check for a current Web-side environment. The byte code signature component refuses to sign when the environment is not secure, further executes the signature operation when the environment is secure, and returns signature result data to the glue component. The glue component feeds back the signature result data to the service code.

In conclusion, the Web-side data signature method provided in this embodiment can receive the signature request of the target data, detect whether the Web-side meets the preset running condition, if the Web-side meets the running condition, obtain the byte code signature information and the corresponding glue information from the server, process the byte code signature information and the glue information, to obtain the corresponding byte code signature component and the corresponding glue component, and schedule the byte code signature component by using the glue component, to sign the target data. By using a manner in which a byte code signature component that cannot be easily cracked is established, and then the byte code signature component is scheduled by using a glue component for signing, security of signature logic and security of signed data are effectively improved.

Embodiment 2

Figure 7:
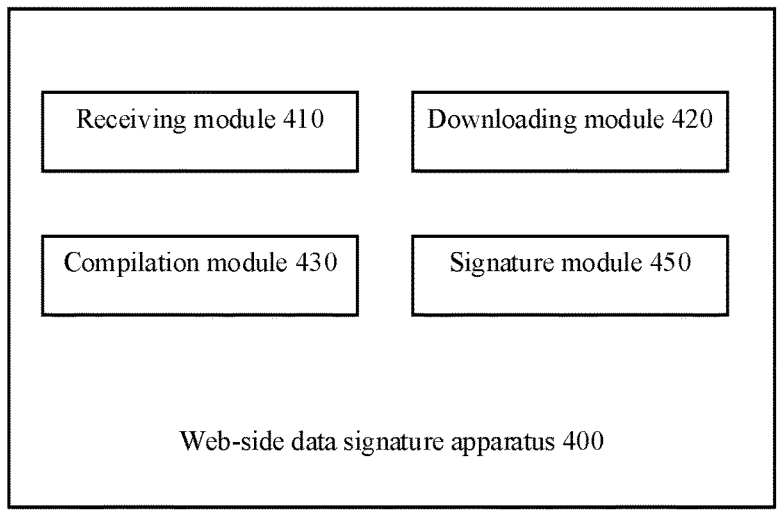
FIG. 7 is a schematic diagram of a program module of a Web-side data signature apparatus according to an embodiment of this application.

FIG. 7 is a schematic block diagram of a Web-side data signature apparatus according to Embodiment 2 of this application. The Web-side data signature apparatus may be divided into one or more program modules, and the one or more program modules are stored in a storage medium and are executed by one or more processors, to complete this embodiment of this application. The program module in this embodiment of this application is a series of computer-readable instruction segments that can complete a specific function. The following specifically describes a function of each program module in this embodiment.

As shown in FIG. 7, a Web-side data signature apparatus 400 may include a receiving module 410, a downloading module 420, a processing module 430, and a signature module 440.

The receiving module 410 is configured to receive a signature request of target data.

The downloading module 420 is configured to obtain byte code signature information and corresponding glue information from a server.

The processing module 430 is configured to process the byte code signature information and the glue information, to obtain a corresponding byte code signature component and a corresponding glue component, and associate the byte code signature component with the glue component.

The signature module 440 is configured to schedule the byte code signature component by using the glue component, to sign the target data.

In an example of this embodiment, the downloading module 420 is further configured to detect whether a Web-side meets a preset running condition, and reject the signature request if the Web-side does not meet the running condition. This specifically includes: controlling the Web-side to execute an initialization command in a same coding format as that of the byte code signature component; and if the initialization command is successfully executed, indicating that the Web-side meets the running condition of the byte code signature component.

In an example of this embodiment, the processing module 430 is further configured to: perform instantiation on the byte code signature information to obtain the byte code signature component, perform instantiation on the glue information to obtain the glue component, and associate the byte code signature component with the glue component; and set a public interface for the byte code signature component, where the public interface is configured to receive an external parameter and execute a signature function, set a signature interface for the glue component, where the signature interface is configured to schedule external data, and set an association interface for the glue component, where the association interface is configured to associate with the public interface of the byte code signature component. The byte code signature component is implemented based on WebAssembly, and the glue component is implemented based on JavaScript.

In an example of this embodiment, the signature module 440 is further configured to: input a signature rule parameter of the target data into the glue component by using the signature interface, and schedule the public interface of the byte code signature component by using the glue component, to transmit the signature rule parameter of the target data to the byte code signature component to execute a signature operation.

In an example of this embodiment, the signature module 440 is further configured to: obtain a Web-side parameter corresponding to the Web-side, perform consistency comparison between the Web-side parameter and a preset reference parameter, and refuse to execute the signature operation if the Web-side parameter is inconsistent with the reference parameter. When the Web-side is a browser, the Web-side parameter includes a browser window size and/or a page port.

Embodiment 3

Figure 8:
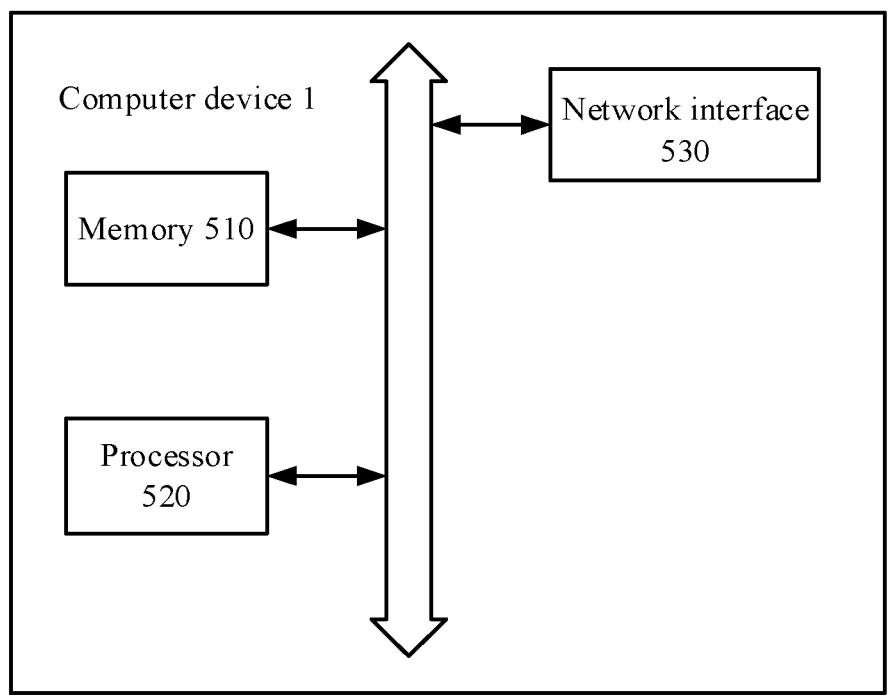
FIG. 8 is a schematic diagram of an optional hardware architecture of a computer device according to this application.

FIG. 8 is a schematic diagram of a hardware architecture of a computer device 1 that is applicable to implementing a Web-side data signature method according to Embodiment 3 of this application. In this embodiment, the computer device 1 is a device that can automatically calculate a value and/or process information based on an instruction that is set or stored in advance. For example, the computer device 1 may be a rack server, a blade server, a tower server, or a cabinet server (including an independent server, or a server cluster formed by a plurality of servers) having a gateway function. As shown in FIG. 9, the computer device 1 at least includes but is not limited to: a memory 510, a processor 520, and a network interface 530 that can be communicatively connected to each other by using a system bus.

The memory 510 includes at least one type of computer-readable storage medium. The readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 510 may be an internal storage module of the computer device 1, such as a hard disk or a memory of the computer device 1. In some other embodiments, the memory 510 may be an external storage device of the computer device 1, for example, a removable hard disk, a smart media card (SMC), a secure digital (SD) card, or a flash card that is disposed on the computer device 1. Certainly, the memory 510 may alternatively include both the internal storage module of the computer device 1 and the external storage device of the computer device 1. In this embodiment, the memory 510 is generally configured to store an operating system and various application software that are installed on the computer device 1, for example, program code of the Web-side data signature method. In addition, the memory 510 may be further configured to temporarily store various types of data that has been output or is to be output.

In some embodiments, the processor 520 may be a central processing unit (CPU), a controller, a microcontroller, a microprocessor, or another data processing chip. The processor 520 is generally configured to control an overall operation of the computer device 1, for example, execute control and processing related to data interaction or communications performed by the computer device 1. In this embodiment, the processor 520 is configured to run program code stored in the memory 510 or process data.

The network interface 530 may include a wireless network interface or a wired network interface, and the network interface 530 is generally configured to establish a communication link between the computer device 1 and another computer device. For example, the network interface 530 is configured to: connect the computer device 1 to an external terminal by using a network, and establish a data transmission channel, a communication link, and the like between the computer device 1 and the external terminal. The network may be an intranet, the Internet, Global System for Mobile communications (GSM), Wideband Code Division Multiple Access (WCDMA), a 4G network, a 5G network, Bluetooth®, or a wireless or wired network such as Wi-Fi®.

It should be noted that FIG. 8 shows only a computer device with the components 510 to 530. However, it should be understood that implementation of all the shown components is not required, and more or fewer components may be alternatively implemented.

In this embodiment, the program code of the Web-side data signature method stored in the memory 510 may be further divided into one or more program modules, and executed by one or more processors (the processor 520 in this embodiment), to complete this embodiment of this application.

Embodiment 4

This embodiment further provides a computer-readable storage medium. The computer-readable storage medium stores computer-readable instructions. The computer-readable instructions are executed by a processor to implement the following steps:

receiving a signature request of target data; detecting whether a Web-side meets a preset running condition; obtaining byte code signature information and corresponding glue information from a server; processing the byte code signature information and the glue information, to obtain a corresponding byte code signature component and a corresponding glue component, and associating the byte code signature component with the glue component; and scheduling the byte code signature component by using the glue component, to sign the target data.

In this embodiment, the computer-readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of a computer device, such as a hard disk or a memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may include both an internal storage unit of the computer device and an external storage device of the computer device. In this embodiment, the computer-readable storage medium is generally configured to store an operating system and various application software that are installed on the computer device, for example, program code of a component management method for a service platform in the embodiments. In addition, the computer-readable storage medium may be further configured to temporarily store various types of data that has been output or is to be output.

Clearly, a person skilled in the art should understand that modules or steps in the foregoing embodiments of this application may be implemented by using a general computing apparatus. The modules or steps may be concentrated on a single computing apparatus or distributed on a network formed by a plurality of computing apparatuses. Optionally, the modules or steps may be implemented by using program code executable by the computing apparatus. Therefore, the modules or steps may be stored in a storage apparatus, and are to be executed by the computing apparatus. In some cases, steps shown or described may be performed in a sequence different from a sequence herein, or the modules or steps may be separately fabricated into integrated circuit modules, or a plurality of modules or steps in the modules or steps are fabricated into a single integrated circuit module. In this way, a combination of any specific hardware and software is not limited in the embodiments of this application.

The foregoing descriptions are merely preferred embodiments in the embodiments of this application, and are not intended to limit the scope of the embodiments of this application. Any equivalent structure or equivalent process change made by using the content of the specification and the accompanying drawings of the embodiments of this application, or when directly or indirectly applied to other related technical fields shall fall within the protection scope of the embodiments of this application.

What is claimed is:

1. A Web-side data signature method, wherein the method comprises:

receiving a signature request to sign target data via a Web-side page;

obtaining byte code signature information and corresponding glue information from a server based on the signature request;

processing the byte code signature information to generate a byte code signature component, wherein the byte code signature component is generated by performing instantiation on the byte code signature information;

processing the glue information to generate a glue component, wherein the glue component is generated by performing the instantiation on the glue information;

associating the byte code signature component with the glue component, wherein the associating the byte code signature component with the glue component further comprises:

setting a public interface for the byte code signature component, wherein the public interface is configured to receive an external parameter and execute a signature function; and setting a signature interface for the glue component, wherein the signature interface is configured to schedule external data, and setting an association interface for the glue component, wherein the association interface is configured to associate with the public interface of the byte code signature component; and scheduling the byte code signature component by using the glue component to sign the target data.

2. The Web-side data signature method according to claim 1, wherein after the receiving a signature request and before the obtaining byte code signature information and corresponding glue information from the server, the method further comprises:

detecting whether a Web-side meets a preset running condition, wherein the web-side comprises a web browser or an application on a computer device; and rejecting the signature request in response to determining that the Web-side does not meet the preset running condition.

3. The Web-side data signature method according to claim 2, wherein the detecting whether the Web-side meets the preset running condition comprises:

controlling the Web-side to execute an initialization command in a same coding format as that of the byte code signature component; and determining that the Web-side meets the preset running condition after the initialization command is successfully executed.

4. The Web-side data signature method according to claim 1, wherein the byte code signature component is implemented based on WebAssembly, and the glue component is implemented based on JavaScript.

5. The Web-side data signature method according to claim 1, wherein the scheduling the byte code signature component by using the glue component to sign the target data comprises:
inputting a signature rule parameter of the target data into the glue component by using the signature interface; and
scheduling the public interface of the byte code signature component by using the glue component to transmit the signature rule parameter of the target data to the byte code signature component, and executing a signature operation by the byte code signature component.

6. The Web-side data signature method according to claim 5, wherein before the byte code signature component executes the signature operation, the method further comprises: obtaining a Web-side parameter corresponding to the Web-side; performing consistency comparison between the Web-side parameter and a preset reference parameter; and refusing to execute the signature operation in response to determining that the Web-side parameter is inconsistent with the reference parameter.

7. The Web-side data signature method according to claim 6, wherein when the Web-side is a browser, the Web-side parameter comprises a browser window size or a page port.

8. A computer device, wherein the computer device comprises a memory and a processor, the memory stores a computer program executable by the processor, and the computer program is executed by the processor to implement operations comprising:
receiving a signature request to sign target data via a Web-side page;
obtaining byte code signature information and corresponding glue information from a server based on the signature request;
processing the byte code signature information to generate a byte code signature component, wherein the byte code signature component is generated by performing instantiation on the byte code signature information;
processing the glue information to generate a glue component, wherein the glue component is generated by performing the instantiation on the glue information;
associating the byte code signature component with the glue component, wherein the associating the byte code signature component with the glue component further comprises:
setting a public interface for the byte code signature component, wherein the public interface is configured to receive an external parameter and execute a signature function; and
setting a signature interface for the glue component, wherein the signature interface is configured to schedule external data, and setting an association interface for the glue component, wherein the association interface is configured to associate with the public interface of the byte code signature component; and
scheduling the byte code signature component by using the glue component to sign the target data.

9. The computer device according to claim 8, wherein after the receiving a signature request and before the obtaining byte code signature information and corresponding glue information from the server, the operations further comprise:
detecting whether a Web-side meets a preset running condition, wherein the web-side comprises a web browser or an application on the computer device; and
rejecting the signature request in response to determining that the Web-side does not meet the preset running condition.

10. The computer device according to claim 9, wherein the detecting whether the Web-side meets the preset running condition comprises:
controlling the Web-side to execute an initialization command in a same coding format as that of the byte code signature component; and
determining that the Web-side meets the preset running condition when the initialization command is successfully executed.

11. The computer device according to claim 8, wherein the scheduling the byte code signature component by using the glue component to sign the target data further comprises:
inputting a signature rule parameter of the target data into the glue component by using the signature interface; and
scheduling the public interface of the byte code signature component by using the glue component to transmit the signature rule parameter of the target data to the byte code signature component, and executing a signature operation by the byte code signature component.

12. The computer device according to claim 11, wherein before the byte code signature component executes the signature operation, the operations further comprise:
obtaining a Web-side parameter corresponding to the Web-side;
performing consistency comparison between the Web-side parameter and a preset reference parameter; and
refusing to execute the signature operation in response to determining that the Web-side parameter is inconsistent with the reference parameter.

13. A non-transitory computer-readable storage medium, wherein the computer-readable storage medium stores a computer program, and when the computer program is executed by at least one processor, the at least one processor performs operations comprising:
receiving a signature request to sign target data via a Web-side page;
obtaining byte code signature information and corresponding glue information from a server based on the signature request;
processing the byte code signature information and to generate a byte code signature component, wherein the byte code signature component is generated by performing instantiation on the byte code signature information;
processing the glue information to generate a glue component, wherein the glue component is generated by performing the instantiation on the glue information;
associating the byte code signature component with the glue component, wherein the associating the byte code signature component with the glue component further comprises:
setting a public interface for the byte code signature component, wherein the public interface is configured to receive an external parameter and execute a signature function; and
setting a signature interface for the glue component, wherein the signature interface is configured to schedule external data, and setting an association interface for the glue component, wherein the association interface is configured to associate with the public interface of the byte code signature component; and scheduling the byte code signature component by using the glue component to sign the target data.

14. The non-transitory computer-readable storage medium according to claim 13, wherein after the receiving a signature request and before the obtaining byte code signature information and corresponding glue information from the server, the operations further comprise:

detecting whether a Web-side meets a preset running condition, wherein the web-side comprises a web browser or an application on a computer device; and rejecting the signature request in response to determining that the Web-side does not meet the preset running condition.

15. The non-transitory computer-readable storage medium according to claim 14, wherein the detecting whether the Web-side meets the preset running condition comprises:

controlling the Web-side to execute an initialization command in a same coding format as that of the byte code signature component; and determining that the Web-side meets the preset running condition when the initialization command is successfully executed.

16. The non-transitory computer-readable storage medium according to claim 13, wherein the scheduling the byte code signature component by using the glue component to sign the target data further comprises:

inputting a signature rule parameter of the target data into the glue component by using the signature interface; and scheduling the public interface of the byte code signature component by using the glue component to transmit the signature rule parameter of the target data to the byte code signature component, and executing a signature operation by the byte code signature component.

17. The non-transitory computer-readable storage medium according to claim 16, wherein before the byte code signature component executes the signature operation, the operations further comprise:

obtaining a Web-side parameter corresponding to the Web-side;

performing consistency comparison between the Web-side parameter and a preset reference parameter; and refusing to execute the signature operation in response to determining that the Web-side parameter is inconsistent with the reference parameter.

* * * * *